3,846,154
PRODUCTION OF NUCLEAR FUEL
Raymond Léon René Lefevre, Broadstone England, assignor to United Kingdom Atomic Energy Authority, London, England
No Drawing. Filed Dec. 7, 1971, Ser. No. 205,733
Claims priority, application Great Britain, Dec. 23, 1970, 61,266/70
Int. Cl. C23c 11/10
U.S. Cl. 117—46 CG    8 Claims

ABSTRACT OF THE DISCLOSURE

Hitherto most nuclear fuel spheroids, having multiple coatings of fission product retaining materials, have a fairly thick coating of porous pyrocarbon, followed by denser coatings. With nuclear fuel, in an oxide form, it becomes necessary to apply the innermost layer in an atmosphere rich in carbon monoxide so as to inhibit the reaction $C+O \rightarrow CO$. The supply of carbon monoxide is continued until the porous layer has been sealed by other high density layers. The invention reduces or eliminates the need for a carbon monoxide supply by the application of a flash sealing layer direct on the spheroid before application of the porous layer.

BACKGROUND OF THE INVENTION

This invention relates to the production of coated particles of nuclear fuel especially those particles which have an oxide kernel. As will be known the application of fission product retaining coatings on to nuclear fuel spheroids usually involves depositing pyrocarbon on to the surface by pyrolysis of a hydrocarbon coating gas. In the case of an oxide kernel, particularly, there is a probability that at the temperatures employed a part of the oxygen will combine with carbon to form gaseous compounds and in this way the kernel, so carefully prepared, becomes damaged and may disintegrate before the coating process has been completed. It has been the practice to lay down an initial coating layer which is porous, and hence not leak tight, to accommodate kernel expansion. In order to inhibit the reaction between the oxygen in the kernel and the carbon in the coating gas it has been the practice to carry out the pyrolysis of the hydrocarbon coating gas in an atmosphere rich in carbon monoxide so that the increased partial pressure of CO tends to push the reaction $C+O \rightarrow CO$ further to the left and so preserve the integrity of the kernel. However, the use of the gas CO is both expensive and dangerous.

SUMMARY OF THE INVENTION

According to the present invention a process for the production of coated spheroids, containing nuclear fuel and oxygen in a combined form, with fission product retaining coating layers, at least the inner one or ones of which are of a carbonaceous nature resides in applying directly onto the spheroid a thin sealing layer of pyrocarbon deposited by pyrolysis of a hydrocarbon gas and serving to retain such partial pressure of carbon monoxide as is formed by reaction between the carbon and the oxygen whilst the further fission product retaining layers are applied on top of the thin sealing layer, one or more of such further layers being applied at a higher temperature than the thin sealing layer. It will be appreciated that when the coated spheroids are subjected to more rigorous conditions than exist in the coating process, e.g. in a nuclear reactor, the thin sealing layer nearest the spheroid kernel will fracture but its sealing function will be carried out by one or more of such further layers. It is preferred to apply a porous layer of pyrocarbon immediately on top of the thin sealing layer so that the porous layer can absorb fission product gases and stress distortions of the spheroid kernel. On top of the porous layer it is preferred to deposit a layer of high density isotropic pyrocarbon followed by a layer of silicon carbide followed in turn by a final layer of high density isotropic pyrocarbon. Thus it will be apparent that apart from the thin innermost sealing layer of pyrocarbon which is sacrificial in the sense that it breaks up under irradiation, the other preferred coating layers are those presently recommended by the Dragon Project. Hence, once the fuel is in the reactor, the spheroids will exhibit burn up properties corresponding to conventional Dragon type fuel.

DESCRIPTION OF THE PREFERRED EMBODIMENT

Example 1000 grams of $UO_2$ spheroids were placed in a fluidised bed furnace and fluidised as a bed in a stream of inert gas. The furnace was heated quickly to about 1300° C. and at that temperature methane gas was admitted along with the fluidising gas. The partial pressure of the methane was very low (e.g. 10 percent) so that under the furnace conditions quick pyrolysis of the gas occurred and a dense layer of pyrocarbon was deposited on to the spheroids. Once the dense layer was thick enough to form an effective gas seal, i.e. about 5 $\mu$m., the supply of the methane gas was stopped and, when the furnace temperature reached 1400° C., the methane gas supply was reinstated so that a porous layer of pyrcarbon began to form on the dense sealing layer. This coating condition was continued until a porous layer of 35 $\mu$m. thick was built up, giving a thickness of a porous layer equivalent to that found in conventional coated particle fuel. The thickness of 35 $\mu$m., or more, requires a prolonged coating period at 1400° C. when normally reaction with the pyrocarbon and the uranium oxide would occur but for the presence of the inner sealing layer which retains whatever CO is generated during its application.

If the inner sealing layer were absent then the conventional mode of surpressing the formation of CO would have to be relied upon namely the continuous supply of carbon monoxide gas into the furnace. With the present invention it is unnecessary to have an extraneous source of CO during the application of the porous layer.

After the porous layer the next layer to be deposited, again from a hydrocarbon gas, is a high density layer of isotropic pyrocarbon, formed at 1900° C., 30 $\mu$m. thick and this in turn is followed by a silicon carbide layer, 35 $\mu$m. thick, using conventional furnace conditions at 1650° C., known for these layers.

Finally an outer layer also of high density isotropic pyrocarbon is deposited at a similar temperature and to similar thickness. Note that the sealing layer around the porous layer which is conventionally employed is omitted since there is already a seal which will perform its function during the manufacturing stages, and that the silicon carbide and high density layers can quite well act as a sealing layer about the porous layer during use of the fuel in a nuclear reactor, if the thin inner seal breaks. By the use of a thin sealing layer about the oxide fuel particle, the present invention obviates the need for this sealing layer whose function is merely to protect what is beneath it during the application of these 3 outer layers which require a rather higher furnace temperature.

If desired, some extraneous CO may be fed in during the deposition of the thin inner sealing layer but the supply can be discontinued during the deposition of the adjacent porous layer.

I claim:

1. A method of preparing nuclear fuel particles having kernels of oxide fuel, comprising the steps of pyrolytically depositing first, second and third coatings of carbon onto the oxide fuel kernels from hydrocarbon gas, the first coating being relatively thin and the second and third coatings relatively thick, the first and third coatings being of relatively high density and the second coating being of relatively low density and porous, the first coating being substantially impermeable to gases during the application of the second and third coatings.

2. The method of Claim 1 wherein the thickness of the first coating is about five microns and the thicknesses of the second and third coatings are about thirty-five microns and about thirty microns respectively.

3. The method of Claim 1 wherein the thickness of the second coating is at least thirty-five microns.

4. The method of Claim 1 wherein the kernels comprise uranium dioxide.

5. The method of Claim 1 comprising the further step of pyrolytically depositing a coating of silicon carbide onto said third coating.

6. The method of Claim 5 wherein said coating of silicon carbide is about thirty-five microns in thickness.

7. The method of Claim 1 wherein the first coating is deposited at about 1300° C., the second coating is deposited at about 1400° C., and the third coating is deposited at about 1900° C.

8. The method of Claim 7 comprising the further step of pyrolytically depositing a coating of silicon carbide at about 1650° C. onto said third coating.

References Cited

UNITED STATES PATENTS

| 3,325,363 | 6/1967 | Goeddel et al. | 117—100 B |
| 3,488,409 | 1/1970 | Beutler et al. | 264—.5 |
| 3,471,314 | 10/1969 | Beatty et al. | 176—91 R |

WILLIAM D. MARTIN, Primary Examiner

J. A. BELL, Assistant Examiner

U.S. Cl. X.R.

117—100 B; 176—91 R, 91 SP; 264—0.5